March 27, 1951 S. VELLA 2,546,411
APPARATUS FOR DIGGING AND HARVESTING VEGETABLES
Filed Dec. 3, 1947 5 Sheets-Sheet 4

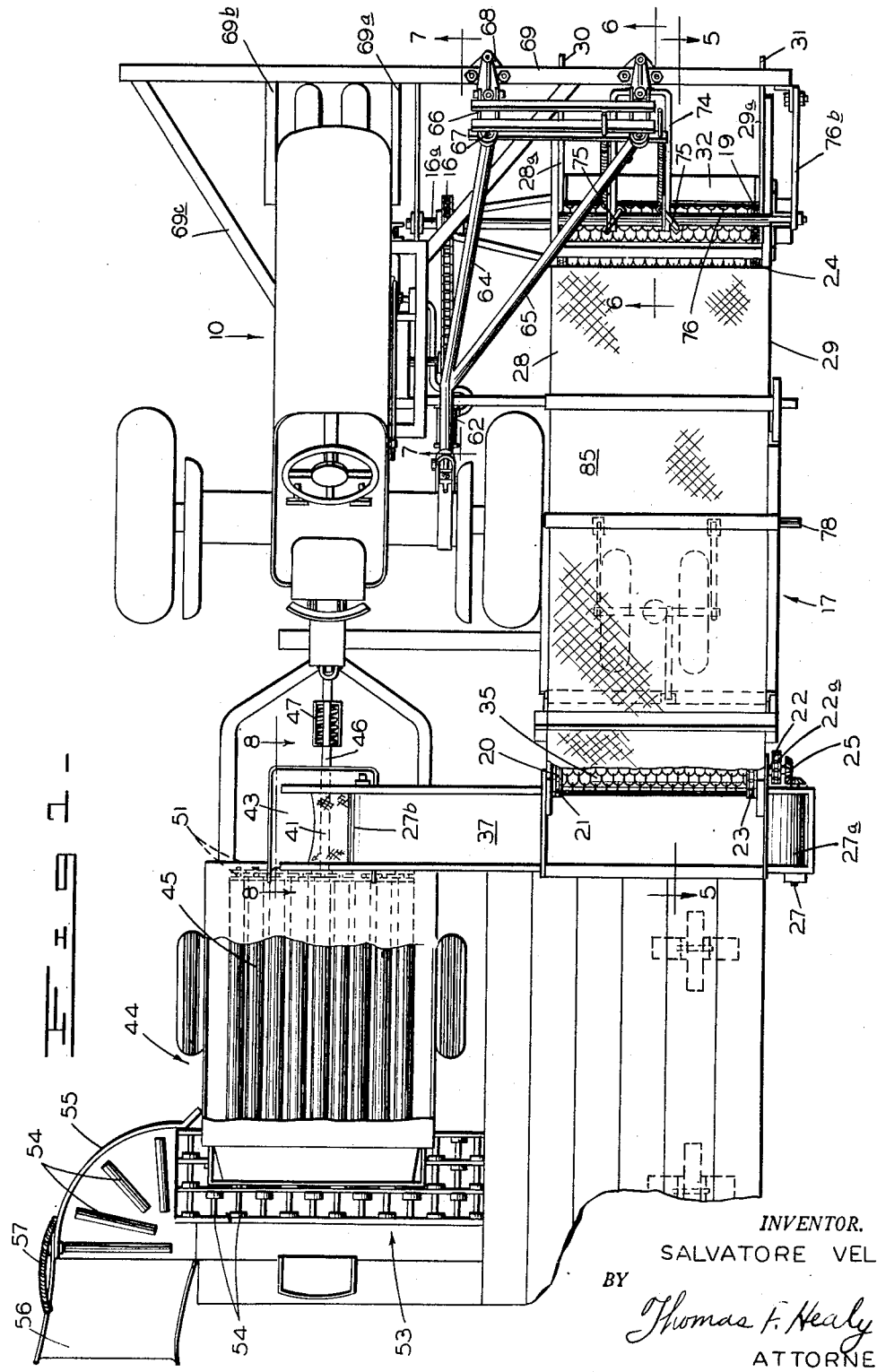

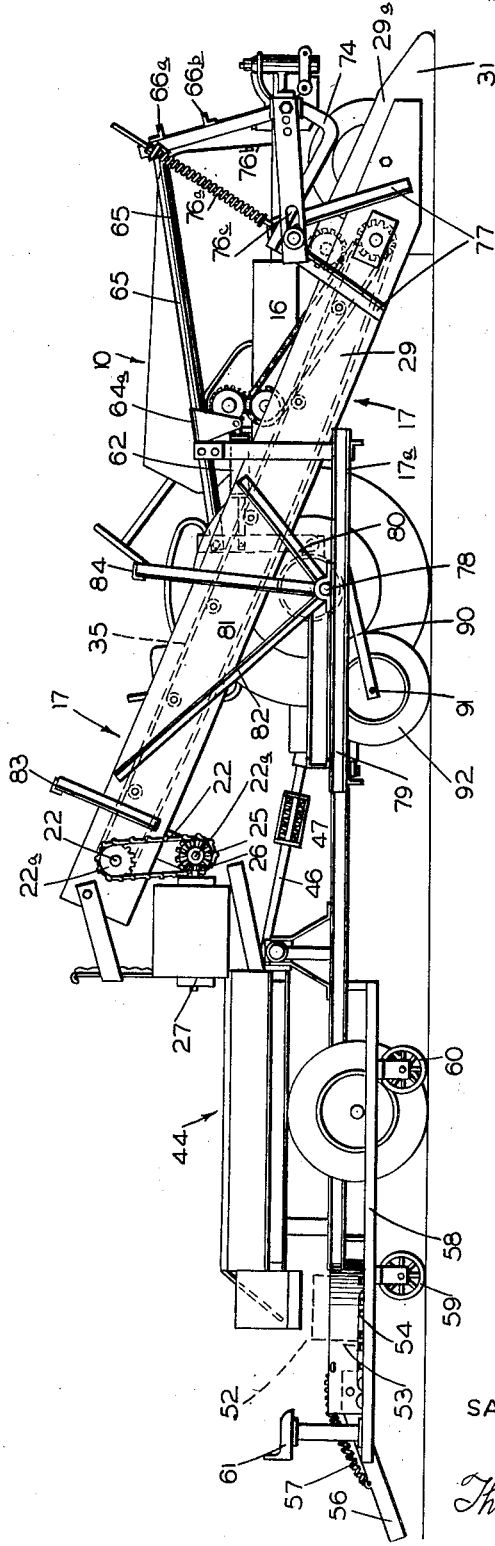

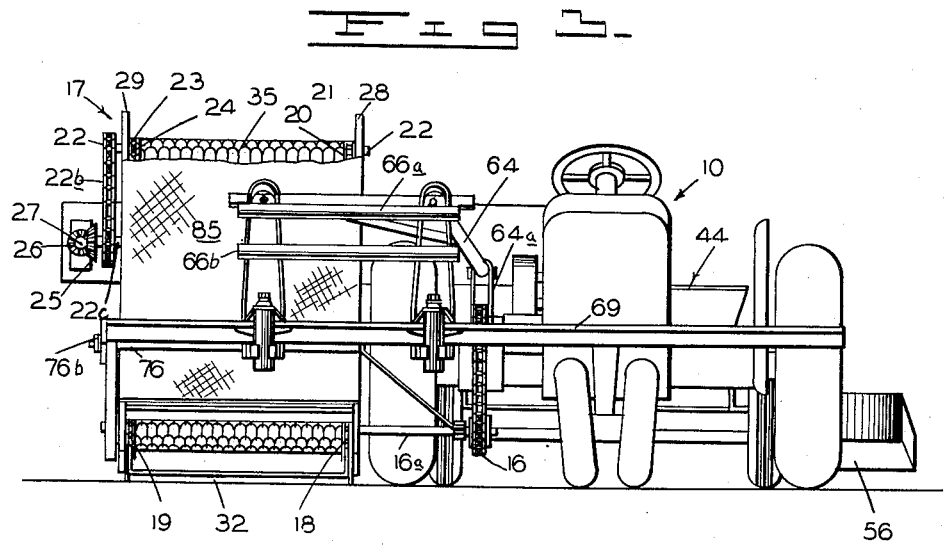
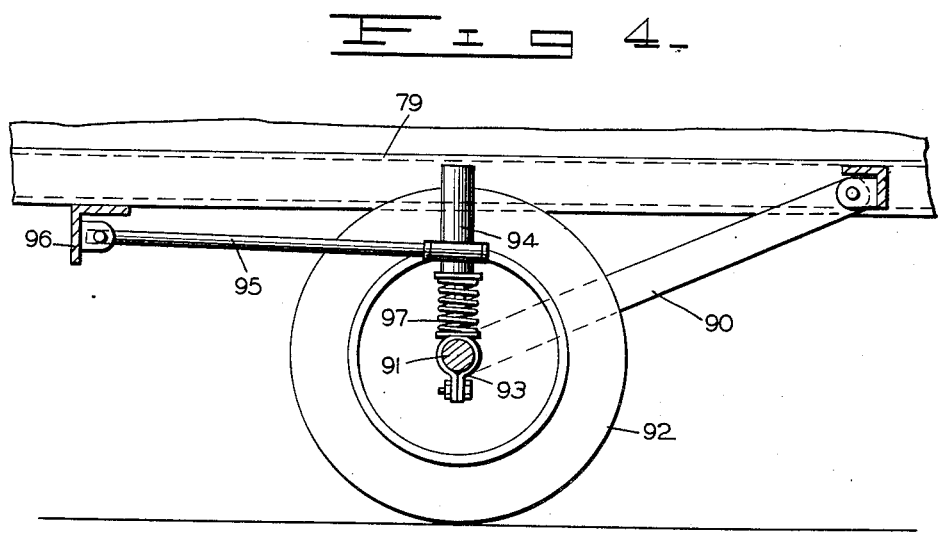

INVENTOR.
SALVATORE VELLA
BY
Thomas F. Healy
ATTORNEY

March 27, 1951 S. VELLA 2,546,411
APPARATUS FOR DIGGING AND HARVESTING VEGETABLES
Filed Dec. 3, 1947 5 Sheets-Sheet 5
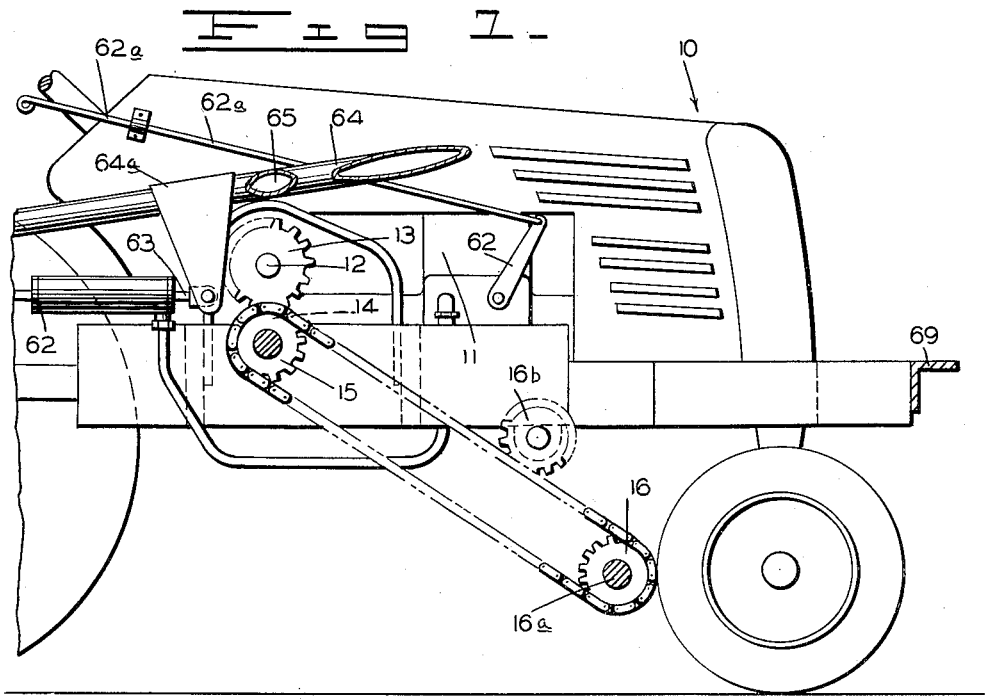
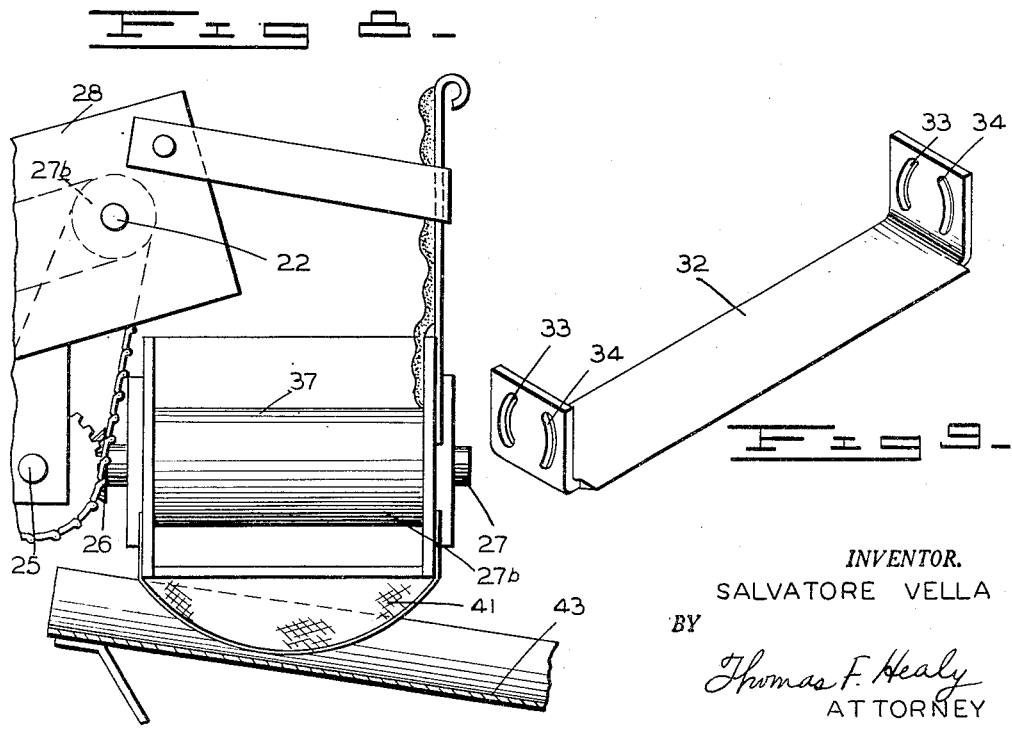
INVENTOR.
SALVATORE VELLA
BY
Thomas F. Healy
ATTORNEY Patented Mar. 27, 1951

2,546,411

UNITED STATES PATENT OFFICE 2,546,411

APPARATUS FOR DIGGING AND HARVESTING VEGETABLES

Salvatore Vella, Albion, N. Y.

Application December 3, 1947, Serial No. 789,379

3 Claims. (Cl. 55—51)

The present invention relates to a vegetable digger and harvester apparatus and more particularly to an apparatus for digging and harvesting onions, turnips, beets, and the like.

The primary object of the present invention is to provide an apparatus for digging, topping and crating such vegetables as onions, turnips, beets, or the like, in one continuous operation.

Another object is to provide an apparatus for digging and harvesting vegetables which may be attached to a tractor and receive its operating power therefrom.

Still a further object is to provide a vegetable digging and harvesting attachment for a tractor which permits vegetables to be dug out of the field, cleaned, topped, crated and deposited on the ground in one continuous operation while the tractor remains in motion.

In one of its broader aspects the present invention relates to an apparatus for digging and harvesting vegetables adapted for attachment to a tractor for movement therewith, and including a mobile frame provided with a digger, an endless conveyor to carry the vegetables from the digger rearwardly to deposit them on an endless belt where they are in turn conveyed to a topper adapted to remove the tops from the vegetables. The vegetables leave the topper and fall into a crate on a roller runway which is curved rearwardly after it leaves the neighborhood of the topper, and is provided with a spring-operated slide flap to permit crates of vegetables passing over the roller runway to be deposited gently on the ground while the tractor is in motion.

Other objects and advantages of the present invention will be apparent from the follow description thereof and from the claims appended thereto.

In the drawing wherein like numerals refer to like or corresponding parts throughout the several views;

Figure 1 is a top plan of the complete digging assembly and embodies the features of the present invention;

Figure 2 is a side elevation of the complete assembly and shows the parts in their relative position;

Figure 3 is a front elevation showing the tractor, digging apparatus and conveyors in their relative positions;

Figure 4 is an enlarged fragmentary sectional view showing the bottom portion of the conveyor frame and the means for mounting a flexible wheel assembly thereon;

Figure 7 is an enlarged fragmentary sectional view taken along line 7—7 of Figure 1, in the direction of the arrows, and showing the means for driving and operating the harvesting and digging apparatus;

Figure 8 is an enlarged fragmentary sectional view taken along line 8—8 of Figure 1, in the direction of the arrows; and Figure 9 is a perspective view of the digger blade disposed at the forward end of the side frame.

Figure 5:
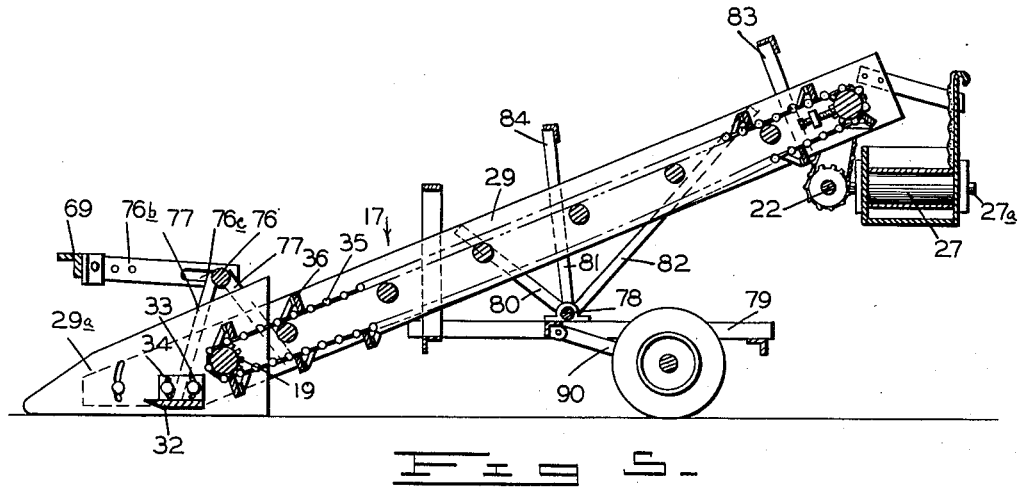
Figure 5 is an enlarged sectional view taken along the line 5—5 of Figure 1, in the direction of the arrows, and showing the digger blades, and conveyor belts and means for mounting said elements in their relative position.

Referring now to the drawing, the numeral 10 generally designates a conventional tractor which has additional power take-offs to operate the digging and harvesting mechanism of the present invention, in a manner as more fully described hereinafter. As the tractor 10 forms no part of the present invention, it is not described in detail, but it includes the usual motor 11 which drives a power take-off shaft 12, which in turn rotates a spur gear 13, which overlies a gear 14 and being keyed to separate shafts for rotation therewith. A sprocket gear 15 is disposed on the same shaft with gear 14, outwardly thereof. Said sprocket 15 has an endless chain engaged thereover to also engage a sprocket gear 16 suitably rotatably secured to a shaft 16a which extends substantially parallel to the power take-off shaft 12, and extends through a side frame of the digging and harvesting assembly, said side frame being generally indicated by reference numeral 17. An idler gear 16b is suitably mounted to the side of the tractor and is in engagement with the endless chain. The purpose of said gear being to keep the chain in constant engagement with said sprocket gears 15 and 16 during the raising and lowering of said side frame 17.

The cross shaft 16a has a sprocket 18 secured thereto, with a second sprocket 19 positioned on the end of the shaft 16a. The sprocket 18 has an endless chain 20 engaging therewith and extending upwardly and rearwardly along the frame 17 to engage a sprocket 21, which is secured to a rotatable shaft 22, which shaft 22 has a second sprocket 23 secured to the other end portion thereof, which sprocket 23 engages an endless chain 24 which extends from the sprocket 19. The shaft 22 extends transversely and exteriorly of the frame 17, and has secured thereto another sprocket 22a, secured for rotation therewith, which sprocket 22a is provided with a downwardly extending chain 22b, which engages a second sprocket on a shaft 22c directly beneath sprocket wheel 22a. The shaft 22c thereby rotates with the shaft 22 and is provided with a bevel gear 25 on the end thereof, which engages a bevel gear 26, secured to a shaft 27, disposed in a suitable frame, and drives roller 27a secured to said shaft 27.

Figure 6:
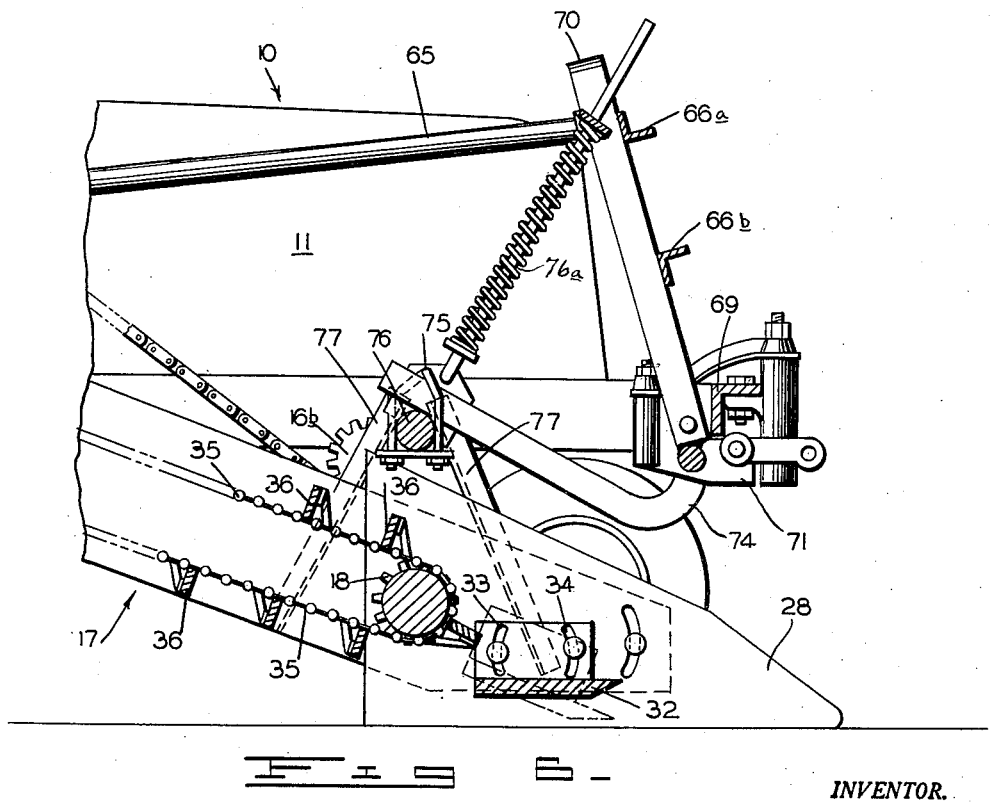
Figure 6 is an enlarged sectional view taken along line 6—6 of Figure 1, in the direction of the arows, and showing the digger blade, conveyor belt and means for raising and lowering said parts.

The mobile side frame 17 has upright side members 28 and 29. Adjustably secured to the forward ends of side members 28 and 29 are guide elements 28a and 29a which terminate in pointed portions 30 and 31, respectively, which engage the ground when the forward portion of frame 17 is in its lowered position. A digger bar or member 32 is secured between the guide elements 28a and 29a of the frame 17. The digger blade 32 is adjustable, and as shown in Figures 6 and 9 of the drawing, is provided with a pair of arcuate slots 33 and 34 so that the pitch of the blade may be altered, depending upon the vegetables being plowed or the general condition of the soil.

Rearwardly of the digger blade 32 is an endless conveyor chain 35 which extends upwardly and rearwardly from said digger blade 32, and is provided with a plurality of spaced-apart ladders 36, which are adapted to receive the vegetables dug up by the digger blade 32, and to convey them upwardly and rearwardly from said blade 32 to be deposited on a second endless belt 37, which extends substantially at right angles to the endless chain 35, and is operated by roller 27a and roller 27b driven by shaft 27.

The endless belt 37 is of a soft material so as to prevent bruising of the vegetables as they fall from the endless conveyor chain 35 thereon. At the end of the endless belt 37, remote from the endless chain conveyor 35, there is a cloth slideway 41. The slideway 41 has inclined interior walls so as to guide the vegetables which fall therethrough to a second slide 43 and into a topper generally indicated by the numeral 44. The topper 44 is of conventional structure and is provided with a plurality of rotatable cutting bars 45, which are powered from the tractor 10, through a power take-off shaft 46, and a spring loaded automatic safety clutch mechanism 47. The power take-off shaft 46 from the tractor 10 operates the cutting bars 45 of the topper 44 through a universal coupling which drives a plurality of gears 51. Said gears 51 are secured to the outer ends of the rotatable cutting bars 45 for rotation therewith. The gear drive from the universal is so arranged that each adjacent cutting bar 45 rotates in an opposite direction.

As the vegetables to be topped fall on the slide 43 and into the topper device 44, they are topped and then deposited in crates 52 which roll along a roller runway generally indicated by the numeral 53. The roller runway 53 is provided with a plurality of roller bars 54, with said roller runway extending substantially at right angles to the topper 44 and the endless conveyor chain 35, and substantially parallel to the endless belt 37. As the roller runway 53 leaves the topper device 44, it curves rearwardly as at 55. The roller runway 53 extends rearwardly for a short distance and terminates in a spring-operated slide flap 56, which is vertically movable and is adapted to receive the crate of vegetables 52 as it passes over roller runway 53 and deposits the same gently on the ground while the tractor is still in motion. The movable slide flap 56 returns to its horizontal position after the crate 52 is deposited on the ground, through the action of the spring 57.

Between the endless belt 37 and the roller runway 53, there is positioned a mobile platform 58, which is provided with spaced-apart wheels 59 and 60. This platform 58 is adapted to hold crates, or the like. The crates are sequentially positioned on the roller runway 53, and manually moved thereover by an operator who sits on the seat 61 where he guides the topped vegetables from the topper 44 appropriately into a crate before shoving it rearwardly to be deposited on the ground while the tractor is still in motion.

As is sometimes the case, the vegetables being dug have rocks or other foreign material therein which are not screened out as the vegetables pass upwardly and rearwardly over the conveyor screen 35. Sometimes this foreign material finds its way over the endless belt 37 and down into the topper 44. So as to safeguard the topper 44, the safety clutch 47 is provided so as to break the connection between the drive shaft 46 of the tractor and the driven rotatable cutting bars 45, in the event that foreign matter is introduced into the topper 44.

As pointed out, the side frame 17 is rockable as well as being mobile. The mechanism for lowering and raising the frame 17 is hydraulically operated, and includes a cylinder 62 provided with a fluid operated piston attached to a rod 63 which is secured to a bracket 64a which in turn is fastened to tie bar 64, which is additionally provided with an off-shoot bar 65. The bar 64 engages a U-shaped bracket 66 at the aperture 67. The U-shaped bracket 66 is also apertured at the free end portion thereof, where it is pivotally secured to a bracket 68 secured to a frame 69 which extends transversely across the front end of the digging and harvesting assembly and is secured to tractor 10 by tie elements 69a, 69b and 69c.

The rod 65 is likewise secured to a U-shaped bracket 70, in the same manner that rod 64 is attached to the U-shaped bracket 66, with said bracket 70 being pivoted to a bracket 71, which bracket 71 is in turn secured to the rod 69, at a point spaced from the bracket 68. The U-shaped brackets 66 and 70 have secured thereto transverse bars 66a and 66b so that said brackets move together.

As is more clearly shown in Figures 6 and 7 of the drawing, the frame 17 is lowered and raised by means of the manually operated fluid operated cylinder 62, through the means of a rod 62a attached to a pivoted link 62b which operates the hydraulic valve. The movement of the hydraulic rod 63 causes the movement of U-shaped brackets 66 and 70. The movement of U-shaped brackets 66 and 70 causes the movement of a pair of spring loaded rods 76a which are secured to a U-shaped yoke 74, which U-shaped yoke 74 has a pair of smaller U-shaped clamps 75 one secured on each arm thereof, which U-shaped clamps 75 are secured to a crosspiece 76, which in turn is secured to angle irons 77, which have the free ends thereof attached to the upright side members 28 and 29 of the frame 17. Thus it can be seen that movement of the rods 64 and 65 in turn is transmitted to raise or lower the ground-engaging pointed portions 30 and 31 through the assembly described.

When rod 65 is moved forwardly the frame 17 is raised from the ground, against the tension of a pair of spring loaded rods 76a. With the upward movement of the forward part of frame 17, the arm 76b which is pivotally mounted on the end of frame 69, moves through the action of rod 76 in slot 76c.

The frame 17 rocks about a pivot bar 78 secured to an underframe 79, with additional strut members 80, 81 and 82 being secured to opposite sides of the upright members 28 and 29 of the frame 17. There is additionally provided a plurality of pairs of upstanding supporting members 83 and 84 on opposite sides of the frame 17, which pairs of upstanding members are adapted to assist in securing a cover 85 over the endless chain 35, so that when the vegetables are transported upwardly on said chain conveyor 35, they do not bounce off of the chain 35, and also to prevent or decrease bruising of the vegetables from jouncing around on the conveyor as the vegetables are moved upwardly and rearwardly to be deposited on the conveyor belt 37.

The frame 17 is mounted on said underframe 79 which has secured to its underside a rod 90 which is pivoted to underframe 79 at one end thereof, and is pivoted at the other end thereof to an axle 91 upon which is mounted wheels 92. Secured to axle 91 by means of clamp 93, is a vertically movable rod 94. A rod 95 is pivotally secured to bracket 96 mounted on carriage 17a. The other end of rod 95 is secured to the vertically movable rod 94 which moves against spring 97. This rocking wheel assembly is of conventional structure and does not per se form a part of the present invention.

In operation, the digging and harvesting assembly of the present invention generally includes the steps of digging the vegetables, conveying the vegetables to a topper, topping the vegetables, crating the topped vegetables, and depositing the crated vegetables on the ground in a continuous operation, it being understood that dirt is separated from the vegetables during the conveying steps.

Various modifications of the present invention will be apparent to those skilled in the art without departing from the spirit or scope thereof, and it is therefore desired to be limited only by the scope of the appended claims.

What I claim is:

1. An apparatus for digging and harvesting vegetables and adapted for attachment to a tractor for movement therewith comprising a mobile rocking frame of rectangular shape provided with upstanding side members, said side members having pointed ground engaging portions at the forward ends thereof, an adjustable digger blade transversely disposed at the forward end of said frame, an endless conveyor carried by said frame between said upstanding side members and having a plurality of spaced-apart ladders adapted to convey the vegetables upwardly and rearwardly, an endless belt disposed substantially at right angles to said endless conveyor and adapted to receive vegetables therefrom, a slideway at the discharge end of said endless belt, a second slideway positioned beneath said first slideway, said first slideway having inclined interior walls for guiding the vegetables which fall therethrough into said second slideway, and a topper device in the path of said second slideway.

2. An apparatus for digging and harvesting vegetables and adapted for attachment to a tractor for movement therewith comprising, a mobile rocking frame of rectangular shape provided with upstanding side members, said side members having pointed ground engaging portions at the forward ends thereof, an adjustable digger blade transversely disposed at the forward end of said frame, and an endless conveyor carried by said frame between said upstanding side members and having a plurality of spaced apart ladders adapted to convey the vegetables upwardly and rearwardly.

3. An apparatus for digging and harvesting vegetables and adapted for attachment to a tractor for movement therewith comprising, a mobile rocking frame of rectangular shape provided with upstanding side members, said side members having pointed ground engaging portions at the forward ends thereof, an adjustable digger blade transversely disposed at the forward end of said frame, an endless conveyor carried by said frame between said upstanding side members and having a plurality of spaced apart ladders adapted to convey the vegetables upwardly and rearwardly, an endless belt disposed substantially at right angles to said endless conveyor and adapted to receive vegetables therefrom, and a topper device adapted to receive vegetables from the discharge end of said endless belt.

SALVATORE VELLA.

REFERENCES CITED

The following references are of record in the file of this patent:

UNITED STATES PATENTS

| Number | Name | Date |
| --- | --- | --- |
| 811,524 | Stewart | Jan. 30, 1906 |
| 832,817 | Sherman | Oct. 9, 1906 |
| 887,343 | McNeal | May 12, 1908 |
| 1,572,499 | Matheson | Feb. 9, 1926 |
| 1,837,077 | Siepp | Dec. 15, 1931 |
| 1,873,352 | Smith | Aug. 23, 1932 |
| 2,083,128 | Sparks | June 8, 1937 |
| 2,096,588 | King | Oct. 19, 1937 |
| 2,102,379 | Nutter | Dec. 14, 1937 |
| 2,227,818 | Bayouth | Jan. 7, 1941 |
| 2,470,211 | Bozeman et al. | May 17, 1949 |